(12) United States Patent
Crews

(10) Patent No.: US 6,207,202 B1
(45) Date of Patent: Mar. 27, 2001

(54) FLAKED FISH FOOD MADE FROM RAW FISH

(76) Inventor: Dennis Crews, 1410 Sawmill Creek Rd., Sitka, AK (US) 99835

( * ) Notice: Subject to any disclaimer, the term of this patent is extended or adjusted under 35 U.S.C. 154(b) by 0 days.

(21) Appl. No.: 09/359,824

(22) Filed: Jul. 23, 1999

(51) Int. Cl.$^7$ ........................................... A23L 1/326
(52) U.S. Cl. .......................... 426/72; 426/331; 426/643; 426/654; 426/658; 426/661
(58) Field of Search ............................. 426/72, 331, 643, 426/654, 658, 661

(56) References Cited

U.S. PATENT DOCUMENTS

| | | | |
|---|---|---|---|
| 3,903,260 | * | 9/1975 | Beigler et al. .................. 424/84 |
| 3,930,018 | * | 12/1975 | Akasahi et al. .................. 424/322 |
| 5,593,978 | * | 1/1997 | Jacobs et al. .................. 514/58 |
| 5,618,574 | * | 4/1997 | Bunch .................. 426/641 |
| 5,773,051 | * | 6/1998 | Kim .................. 426/1 |

* cited by examiner

*Primary Examiner*—Chhaya D. Sayala
(74) *Attorney, Agent, or Firm*—Woodling, Krost and Rust

(57) ABSTRACT

A flaked fish food wherein fresh (raw) fish, vitamins, starches and preservatives are disclosed. The fresh (raw) fish replace fishmeal which has heretofore been used. The fresh (raw) fish when heated gels (binds) the ingredients together in an appealing and substantially water insoluble manner. The fresh (raw) fish may be salmon, halibut, black cod, Pacific cod, herring, rockfish, shrimp and krill (or any other kind of raw fish). A method for making the flaked fish food is also disclosed which includes the steps of grinding the raw fish in a grinder, mixing a vitamin and a preservative in cold water and mixing the ground fish with the cold water, vitamin and preservative mixture, pumping the mixture to a grinder/emulsifier, and heating and drying the mixture.

6 Claims, 1 Drawing Sheet

FLAKED FISH FOOD MADE FROM RAW FISH

BACKGROUND OF THE INVENTION

The invention to be described is a unique process to manufacture flaked fish food for ornamental fish such as those that are kept in a home aquarium, by using undenatured fish protein (raw fish). Flaked fish food is sometimes referred to as flake fish food. The flaked fish food itself is also unique and novel.

There are many types of flaked fish food on the market all of which are made in the same basic way with the same basic ingredients. The major ingredient in all of these products is fishmeal. Fishmeal is a commodity product consisting of ground and processed fish that has been dried to a moisture level of between 4% and 12%. Fishmeal supplies the majority of the protein in the flaked fish food. Fishmeal is a denatured protein.

Denatured proteins are those that have been pre-cooked breaking up some of the amino acid chains into individual amino acid units or into shorter chains. Denatured proteins are incapable of gel formation in the flaked fish food manufacturing process and do not contribute to the binding properties of the finished flaked fish food.

Undenatured proteins are those that have not previously been heat-treated. Undenatured proteins have amino acid chains which are undamaged and are capable of gel formation. Fresh fish (sometimes referred to herein as raw fish or uncooked fish) is an example of an undenatured protein.

Raw fish, or any other animal protein, when first cooked has the ability to "gel" or bind together. An example of this would be an egg or a hamburger. When initially cooked these proteins "stick" together. This is caused by the cell walls rupturing the cytoplasm and then molding together. This will only happen the first time that animal proteins (i.e. raw fish) are cooked or processed. Afterward, as in the case of an egg or hamburger, the protein if chopped up or ground will no longer bind together. In other words, you cannot break up a hamburger into small pieces and stick it back together. This is the stage that fishmeal is in when used as an ingredient for a flaked fish food.

In order to bind the fishmeal together and to add other ingredients to the mix, flaked fish food manufacturers have always used starch binders, such as wheat, rice potato and other plant starches. These starches when cooked will "gel" and bind the ingredients together to make a flaked fish food. The cooked starches bind the fishmeal together so that the flaked fish food will stay at a suitable size for feeding and will not crumble. The bond formed as the result of cooking starches is not very good as compared to the bond formed by cooking raw fish (undenatured protein) as is done in the instant invention.

The problem with the starch bond is that the resulting flaked fish food tends to be stiff and unnatural as food to fish. In addition, since the starch bond is water soluble, the vitamin mixes, and other additives to the food begin to leach out immediately upon being placed in the aquarium. If the flaked food is not eaten right away, a substantial amount of the vitamin mix may leach away into the water before the fish have the opportunity to digest them. Starch bonded fishmeal begins to disintegrate once in the water causing small particles of food to mix with the aquarium water as a pollutant.

Another negative aspect of flaked fish food based on fishmeal is that the food does not appeal to fish because the main ingredient, fish meal, has already been processed once, with most of the fats removed and preservative added. This lack of attractiveness can be the difference between life and death for an aquarium fish whose appetite has been negatively affected by the stress of being new to an aquarium, fighting a sickness, or having its territory invaded by a new fish to the aquarium.

By replacing the fishmeal (denatured protein) with raw fish (undenatured protein, i.e., salmon, halibut, black cod, Pacific cod, herring, rockfish, shrimp and/or krill), the new flaked fish food provides the following unique and innovative characteristics and benefits:

1) A flaked fish food that is very flexible in water resulting in a soft natural feel for the fish when feeding.

2) The protein bond formed by the undenatured proteins (raw fish), while more flexible, is substantially water insoluble unlike the starch bond in fishmeal based flaked foods. The undenatured proteins bind such that the resulting flaked fish food holds together better leaving less food residue in the aquarium. Another benefit is that the water quality of the aquarium is improved. Thus the vitamin mix that has been added to the flaked food stays suspended in the protein binded flake resulting in a much higher level of vitamin intake for the fish.

3) Using fresh seafood instead of fishmeal has shown a much higher level of attractability as compared to fish foods with fishmeal. This is especially important for aquarium fish who are often stressed for a variety of reasons, including being new to a tank, overcrowding, and poor water quality. At times like this fish often will not eat well or stop eating all together. In these situations a flaked food that is highly attractive to fish will make a huge difference to fish survival rates in a home aquarium.

4) In experiments, conducted over a three month period, fish eating only the flaked fish food made with fresh seafood as the main ingredient showed a much higher level of growth than five other types of fishmeal based flaked fish foods.

DESCRIPTION OF THE INVENTION

Figure 1:
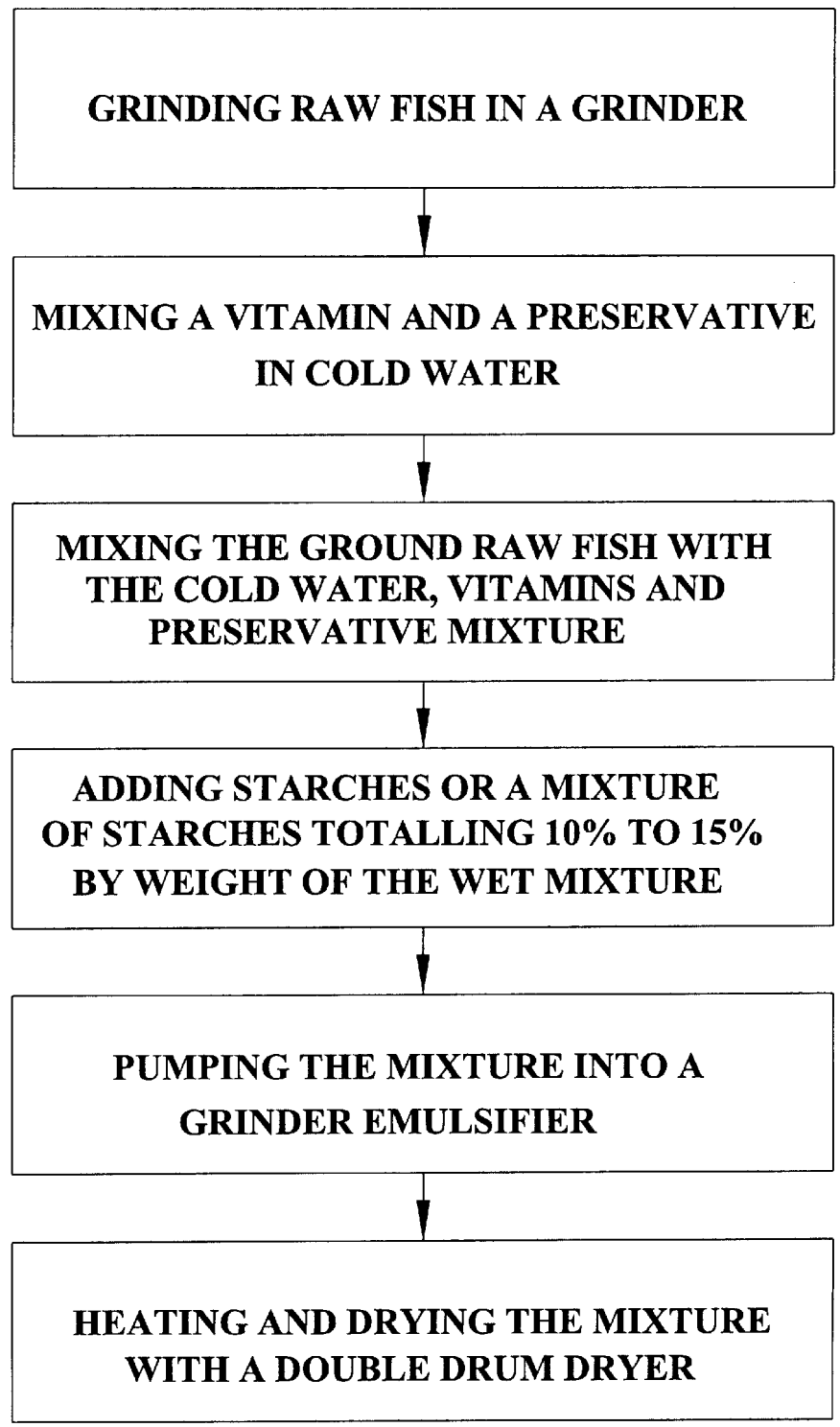
FIG. 1 is a diagrammatic representation of the novel process used to make the novel flaked fish food.

The flaked fish food utilizing fresh seafood instead of fishmeal is produced in the following way:

1. Raw fish is ground in a regular meat grinder through a grinding plate that may vary from one eighth inch holes to one half inch holes. The raw fish may be any one or more of a combination of salmon, halibut, black cod, Pacific cod, herring, rockfish, shrimp and/or krill. Other types of raw fish may be used.

2. The product is then placed in a mixing container with an equal amount (by weight) of cold water (i.e., cold tap water), that has already had a vitamin mix, preservatives, and colorants, and other small additives mixed therewith.

3. The mixture is then blended thoroughly with a mixer that is run between 250 rpm to 1200 rpm.

4. A mixture of grains totaling between 10% to 20% by weight of the wet mix is then added. The grains may be any of the previously mentioned, i.e., wheat, rice and potato.

5. The mixture is then blended again at between 250 rpm to 1200 rpm.

6. The mixture is then pumped to a grinder emulsifier that reduces the particle size while allowing the vitamins and preservatives to mix thoroughly with the raw fish. Throughout this process, the slurry (mixture) must not exceed a temperature of 100° F.

7. The mixture is then pumped to a double drum dryer where it passes between two steam filled drums. The steam filled drums are separated by a gap of between 0.005 to 0.025 inches. Other gap sizes are contemplated. The drums are filled with steam having pressure in the range of 40 to 120 psig and temperatures of between 260° F. and 360° F. Other steam temperatures and pressures may be used. The flaked fish food sticks to the surface of the drums as it passes therethrough and is cooked thoroughly. It is at this point in the process that the flaked fish food gels (binds) together entrapping the vitamins and preservatives therein. A knife blade removes the flaked fish food from the heated drums.

A vitamin mix having vitamin A, vitamin D, vitamin E, vitamin $K_3$, vitamin $B_1$, vitamin $B_2$, vitamin $B_6$, vitamin $B_{12}$, Niacin, Pantothenic acid, Folic acid, Biotin, inositol, and vitamin C and preservatives such as Naturox® may be used in the flaked fish food of the present invention. Naturox® is a registered trademark of Kemin Industries Inc. located in Des Moines, Iowa.

Those skilled in the art will recognize that this invention has been set forth by way of example only and that the claims set forth herein define the invention and are not limited by the examples set forth herein.

What is claimed is:

1. A process for making flaked fish food from raw ground fish, a vitamin mix, starch and a preservative comprising the steps of:

grinding raw fish in a grinder;

mixing a vitamin mix and a preservative in water;

mixing the ground raw fish with water, said vitamin mix and said preservative mixture, and said starch;

pumping the resulting mixture into a grinder emulsifier; and, heating said mixture forming flakes of fish food.

2. A process for making flaked fish food as claimed in claim 1 wherein said flaked fish food is heated as it contacts a heated double drum dryer.

3. A process for making flaked fish food as claimed in claim 2 wherein said double drum dryer is heated at a temperature between 260° F.–360° F.

4. A process of making flaked fish food as claimed in claim 3 wherein said double drum dryer further includes a knife blade for removing said flaked fish food from said dryer.

5. A flaked fish food prepared according to the process of claim 1.

6. A process for making flaked fish food as claimed in claim 1 wherein said raw ground fish is selected from the group consisting of salmon, halibut, black cod, pacific cod, herring, rockfish, shrimp and krill.

* * * * *